US012259122B2

(12) United States Patent
Jepsen

(10) Patent No.: US 12,259,122 B2
(45) Date of Patent: Mar. 25, 2025

(54) ILLUMINATION MODULE FOR A SPEAKER

(71) Applicant: HARMAN BECKER AUTOMOTIVE SYSTEMS GmbH, Karlsbad-Ittersbach (DE)

(72) Inventor: Henrik Kirkeby Jepsen, Vinderup (DK)

(73) Assignee: Harman Becker Automotive Systems Gmbh, Karlsbad-Ittersbach (DE)

( * ) Notice: Subject to any disclaimer, the term of this patent is extended or adjusted under 35 U.S.C. 154(b) by 0 days.

(21) Appl. No.: 18/189,122

(22) Filed: Mar. 23, 2023

(65) Prior Publication Data

US 2023/0304656 A1 Sep. 28, 2023

(30) Foreign Application Priority Data

Mar. 24, 2022 (EP) .................................... 22163973

(51) Int. Cl.

| | |
|---|---|
| ***F21V 33/00*** | (2006.01) |
| ***F21V 21/00*** | (2006.01) |
| ***F21Y 115/10*** | (2016.01) |
| ***H04R 1/02*** | (2006.01) |

(52) U.S. Cl.

CPC .......... *F21V 33/0056* (2013.01); *F21V 21/00* (2013.01); *H04R 1/028* (2013.01); *F21Y 2115/10* (2016.08)

(58) Field of Classification Search

CPC ...... F21V 33/0056; F21V 21/00; H04R 1/028
See application file for complete search history.

(56) References Cited

U.S. PATENT DOCUMENTS

| | | | | |
|---|---|---|---|---|
| 4,817,163 | A * | 3/1989 | Stastny | H04R 1/028 381/189 |
| 7,123,738 | B1 * | 10/2006 | Mizone | H04R 1/028 381/406 |
| 9,464,803 | B2 * | 10/2016 | Salter | B60Q 3/85 |
| 9,813,820 | B2 * | 11/2017 | Yuasa | H04R 7/125 |
| 10,462,546 | B2 * | 10/2019 | Proni | H04R 9/02 |
| 10,914,431 | B2 * | 2/2021 | Kraz | F21V 5/004 |
| 11,193,667 | B2 * | 12/2021 | Hou | F21V 33/0056 |
| 11,536,446 | B2 * | 12/2022 | Liu | G06F 1/1613 |
| 2003/0031330 | A1 * | 2/2003 | Kim | H04R 1/028 381/396 |
| 2007/0223770 | A1 | 9/2007 | Fujisawa et al. | |
| 2021/0156558 | A1 | 5/2021 | Hou et al. | |
| 2023/0105804 | A1 * | 4/2023 | Mao | H04R 1/023 381/332 |

FOREIGN PATENT DOCUMENTS

| | | | |
|---|---|---|---|
| CN | 212319490 | U | 1/2021 |
| DE | 102016122078 | A1 | 8/2017 |
| KR | 200401752 | Y1 | 11/2005 |

* cited by examiner

*Primary Examiner* — Arman B Fallahkhair
(74) *Attorney, Agent, or Firm* — Artegis Law Group, LLP

(57) ABSTRACT

The present disclosure relates to an illumination module for a speaker in an automotive vehicle. According to one aspect, there is provided an illumination module for a speaker, the illumination module comprising: a holder configured to be attachable to the speaker; one or more light sources for emitting light; and one or more lenses for projecting light from the one or more light sources onto an illuminable area of the speaker.

19 Claims, 9 Drawing Sheets

ILLUMINATION MODULE FOR A SPEAKER

CROSS-REFERENCES TO RELATED APPLICATIONS

This application claims the priority of co-pending European patent application titled "ILLUMINATION MODULE FOR A SPEAKER," filed on Mar. 24, 2022, and having application number EP 22163973.5. The subject matter of this related application is hereby incorporated herein by reference.

BACKGROUND

Field of the Various Embodiments

The present disclosure relates to an illumination module for a speaker, in particular to an illumination module for a speaker of an in-vehicle audio system.

Description of the Related Art

In automotive vehicles, so-called "infotainment" systems are becoming ever more common and popular, offering modern electronic amenities for the convenience and enjoyment of both drivers and passengers. Such a system may include, for example, an interactive display device and loudspeakers mounted on or near the dashboard to provide the driver with audio and visual information and driving guidance.

It is increasingly the expectation or even the requirement of the drivers or passengers to be offered the means to access information and receive visual stimulation during the journey. Furthermore, higher-end display hardware such as LED screens typically have high resolutions, requiring the user to look more intensely at the screens, and highly reflective surfaces, rendering them less ideal for use by a driver or passengers inside a moving vehicle whilst seeking driving information, for instance. For the purposes of providing short but prominent in-vehicle messages, and creative ambient lighting, high-resolution displays are not considered necessary or efficient.

There is a need to enhance the overall travel experience of drivers and passengers with improved ways of incorporating, particularly within automotive vehicles, illumination systems that are suitable for ambient lighting and providing information.

SUMMARY

The present disclosure provides an illumination module for a speaker in an automotive vehicle. The illumination module is configured to illuminate a cone of a speaker of an in-vehicle audio system. The illumination can be controlled to correspond to audio being played back by the in-vehicle audio system, thereby providing an enhanced listening experience. Also, the illumination can be controlled to convey information to a driver, such as a warning signal. Further, the illumination can be controller to provide so-called mood lighting.

The illumination module can be mounted to the speaker as an add-on module. It can be made compatible with a variety of speakers. Also, the module can be easily detached from the speaker to facilitate repair or replacement.

The illumination module of the present disclosure may use a membrane of the speaker to create visual effects, without requiring additional, dedicated projection surfaces.

Thus, the illumination module can be implemented with a relatively small number of parts, reducing its weight and the required space in a vehicle.

To achieve the various desired effects, according to one aspect of the present disclosure, there is provided an illumination module for a speaker, the illumination module comprising: a holder configured to be attachable to the speaker; one or more light sources for emitting light; and one or more lenses for projecting light from the one or more light sources onto an illuminable area of the speaker.

The holder enables attaching the illumination module to an existing speaker in the vehicle. For example, the illumination module may be contained within a housing of an existing speaker. Thus, there is no need for a separate structure to mount the illumination module to the interior of the vehicle, for example a dashboard. Also, the module can be made lightweight and compact.

The lenses may be integrated in or attached to the holder. This further contributes to a simple and lightweight structure of the illumination module.

The illumination module may include a plurality of light sources and a plurality of lenses. Each lens may be configured to project light from a respective one of the plurality of light sources onto the illuminable area. Each of the plurality of lenses may be configured to project light onto a respective portion of the illuminable area. Accordingly, it is possible to illuminate defined portions of the illuminable area separately.

The lenses may include one or more optical freeform lenses. Optical free-form lenses may be used to project light from the light sources evenly over a curved or uneven surface. For example, the illuminable area may be cone-shaped, and the optical free-form lenses can be configured to provide an even distribution of light over the cone-shaped illuminable area or portions thereof. The optical free-form lenses may also be used to collimate light from the light sources to project symbols or logos onto the illuminable area.

The light sources may be individually controllable. Thus, portions of the illuminable area can be illuminated at different times, for different durations or at different intensities, thereby generating different visual effects. Also, it is possible to adapt the number of active light sources, or the intensity of individual light sources, depending on parameters such as natural background illumination. This enables minimising the number of active light sources in a given situation, thereby saving energy.

The holder may be annular or ring-segment-shaped, and it may be attachable concentrically to a back side of the speaker. For example, the holder may be arranged around a magnet of the speaker, thereby minimising the additional space required for installing the module.

The illumination module may further include a printed circuit board, PCB. The PCB may contain the light sources. The PCB is configured to be attached to the holder, whereby the light sources are aligned with the lenses. In particular, the PCB may be annular or ring-segment-shaped. Accordingly, the light sources and lenses may be provided on separate elements of the module, respectively. This facilitates the manufacture of the module and the implementation of different combinations of light sources and lenses, to provide different visual effects.

The lenses and the light sources may be equidistantly arranged at a perimeter of the holder and the PCB, respectively. This arrangement can provide for an even illumination of the illuminable area or portions thereof.

The illumination module may further include a housing for receiving the holder and the PCB. The housing may be configured to be attached to the speaker. The housing may facilitate assembly of the module and protect elements contained within it, such as the light sources of the PCB and the lenses of the holder.

The light sources may be light emitting diodes, LEDs, in particular red, green, blue+white (RGBW) LEDs. LEDs are energy-efficient, and RGBW LEDs can be used to provide visual effects in different colours.

According to another aspect of the present disclosure, there is provided a speaker system comprising: a speaker having a membrane, in particular a cone-shaped membrane; and an illumination module as described above attached to the speaker.

The illumination module may be attached to a backside of the speaker. The illuminable area may be formed by at least a portion of the backside of membrane. At least a portion of the membrane may be translucent. Accordingly, light emitted from the light sources and transmitted onto the backside of the membrane partially passes through the membrane and generates a visual effect on a visible front side of the speaker.

The illuminable area may include a plurality of illuminable portions corresponding to the number of lenses and light sources. Accordingly, different portions of the illuminable area may be illuminated with different illumination parameters, thereby generating different visual effects or patterns. For example, it is possible to generate moving or dynamic patterns.

The speaker system may further include a controller to control the light sources in conjunction with an in-vehicle audio, navigation and/or driving assistance system. For example, the controller may control the light sources so as to create a visual pattern that is correlated with music being played by the audio system. In another example, the light sources may be controlled to generate a visual effect intended to attract the user's attention, for example in order to point to a message from the navigation system or the driving assistance system such as a speed limit warning.

BRIEF DESCRIPTION OF THE DRAWINGS

The features, objects, and advantages of the present disclosure will become more apparent from the detailed description set forth below when taken in conjunction with the drawings in which like reference numerals refer to the same or similar elements.

DETAILED DESCRIPTION

The illumination module for a speaker disclosed herein includes a holder, one or more light sources for emitting light, and one or more lenses for projecting light from the light sources onto an illuminable area of the speaker. The module can be attached to the speaker through the holder. By means of the holder, illumination module can be mounted to the speaker as an add-on module. The lenses may be part of the holder, and the light sources may be part of a printed circuit board which can be mounted to the holder, providing a compact and lightweight structure.

The illumination module of the present disclosure is suitable for use with conventional speakers. The elements of conventional speakers are considered to be known as such and therefore not described in detail herein.

Figure 1:
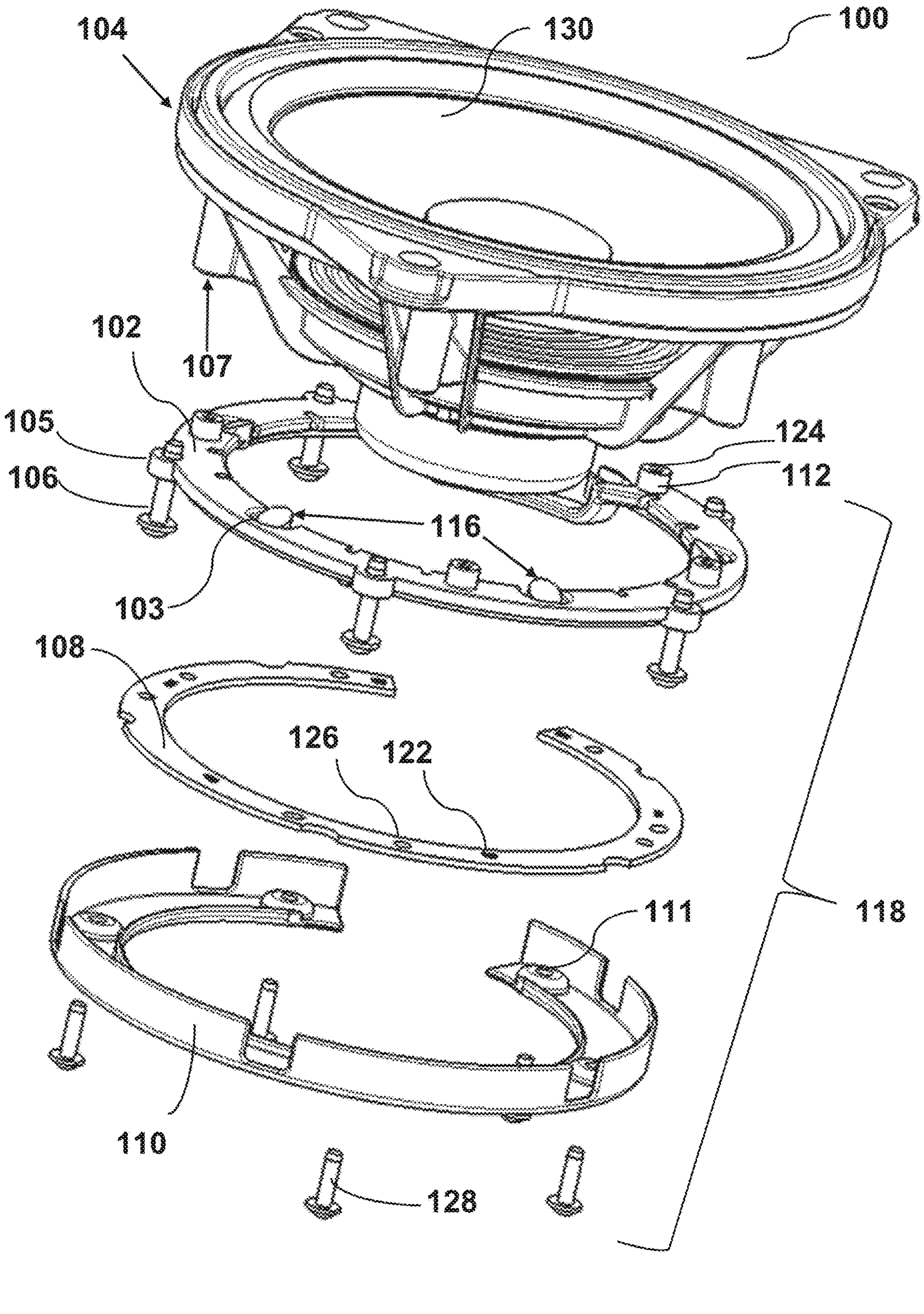
FIG. 1 illustrates an exploded view of the components of a system including an illumination module and a speaker, in accordance with one of a number of embodiments.

With reference to FIG. 1, there is shown a speaker system 100 including an illumination module 118 and a speaker 104, in accordance with one of a number of embodiments. The illumination module 118 includes a holder 102 that may be ring-segment-shaped. The holder 102 can be attached to a backside of the speaker 104 so as to face a backside of a membrane 130 of the speaker 104. In the illustrated example, lenses 116 are arranged at equal distances around the perimeter of the holder 102. Specifically, the lenses 116 may be arranged in cavities 103 of the holder 102 to project light emanating from light sources 122, arranged at an underside of the holder 102, onto the backside of the membrane 130, as described in more detail below.

Figure 2A:
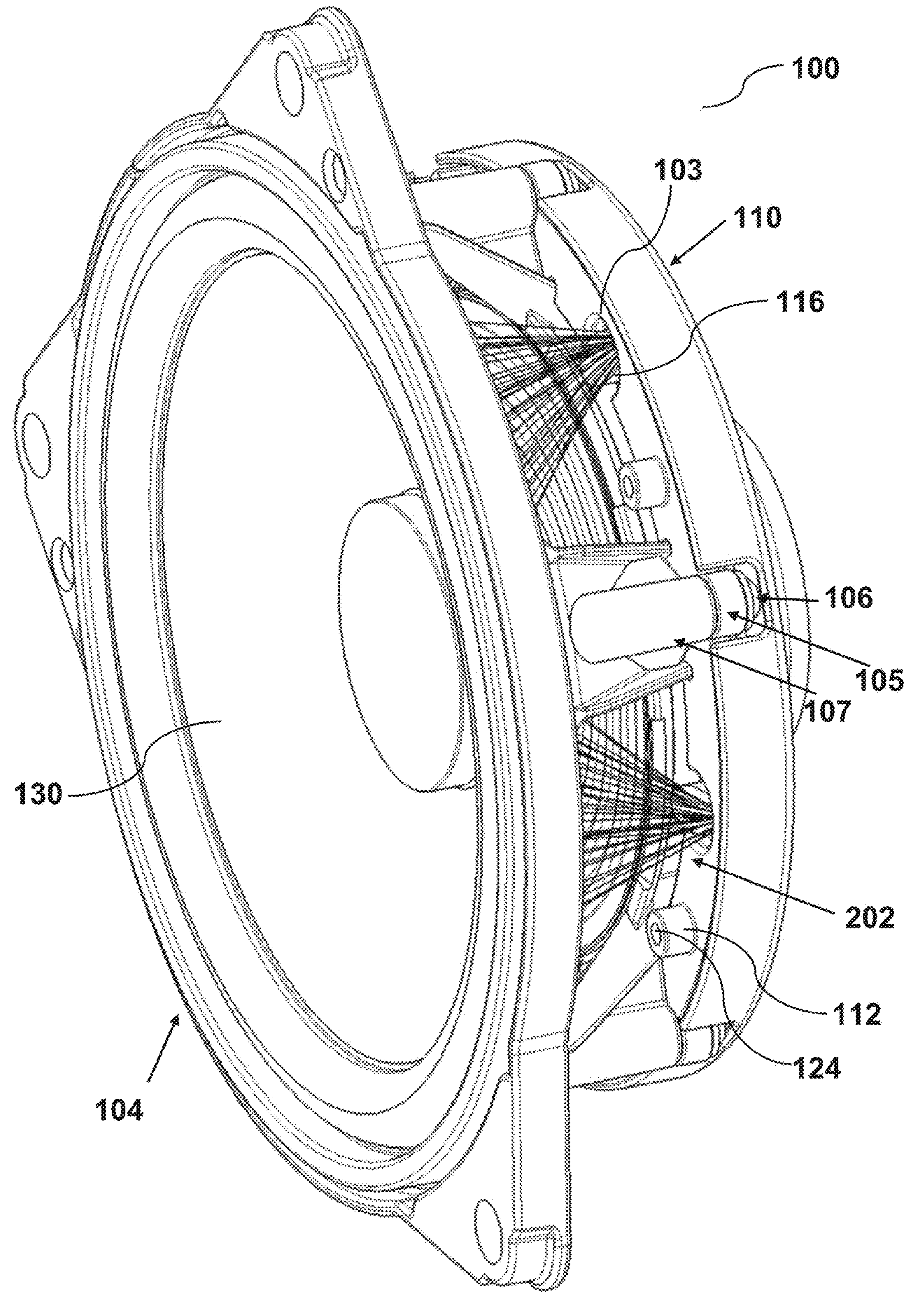
FIG. 2A illustrates a perspective view of the system of FIG. 1 when assembled.

Lugs 105 may be arranged at the outer perimeter of the holder 102. As illustrated in FIGS. 1 and 2A, the lugs 105 may be arranged to align with corresponding fastening elements 107 at the backside of the speaker 104. The fastening elements 107 may be formed by tubular extensions of a housing of the speaker 104. The fastening elements 107 may contain holes that axially align with the openings of the corresponding lugs 105. Fastening pins 106 may be used to fasten the holder 102 to the backside of the speaker, as illustrated in FIG. 2A. Accordingly, the lugs 105, the fastening elements 107 and the fastening pins 106 together form a fastening mechanism that allows the holder 102 to be attached to and detached from the speaker 104. Thus, the illumination module 108 can be provided as an add-on module to the speaker 104. It can be easily removed, for example for the purposes of repair. Also, it can be easily replaced, for example with a different illumination module having different lenses to provide other visual effects.

In one of a number of embodiments, the fastening pins 102 may be formed by screws, and the holes in the fastening elements 107 may be threaded holes.

The illumination module 118 further includes a printed circuit board, PCB, 108 and a housing 110. The holder 102, PCB 108 and housing 110 may be substantially congruent with one another. When assembled, the holder 102 and PCB 108 may be at least partially contained within the housing 110, as shown, for example, in FIGS. 2A and 2B.

The PCB 108 may include a plurality of LEDs 122 arranged on an upper surface of the PCB 108 facing the holder 102. The LEDs 122 may be arranged such as to align with the lenses 116 when the components of the module 118 are assembled. In one of a number of embodiments, the LEDs are RGBW LEDs to enable visual effects in different colors.

As illustrated in FIG. 1, the housing 110 may be attached to the holder 102. To this end, the housing 110 may have a plurality of holes 111 around its perimeter. The holes 111 may be arranged to axially align with corresponding holes 126 in the PCB 108 and holes 124 extending through the holder 102 and through sleeves 112 arranged on the upper surface of the holder 102. Fastening pins 128 may be provided to be received in the holes 111, 126 and 124 and to fasten the housing 110 and the PCB 108 to the holder 102. In the assembled state of the module 118, the PCB 108 may be contained and fixed between the housing 110 and the holder 102.

In one of a number of embodiments, the holes 124 in the holder 102 and/or the sleeves 112 may be threaded, and the fastening pins 128 may be formed by screws.

In the illustrated embodiment, separate fastening mechanisms are provided to fasten the housing 110 to the holder 102, and to fasten the holder 102 to the speaker 104. This has the advantage that the housing 110 may be opened without having to remove the holder 102 from the speaker 104. Thereby, the PCB 108 may be accessed, for example for the purposes of repair or replacement. For example, the PCB 108 may be replaced with another PCB having different LEDs 122 to provide different visual effects.

In an alternative embodiment, the module 118 may be attached to the speaker 104 by means of fastening pins that extend through holes in the housing 110, the PCB 108, the holder 102 and the fastening elements 107 of the speaker 104. In other words, in this alternative embodiment, there is only one fastening mechanism for both the holder 102 and the housing 110. This has the advantage of a reduced number of parts.

In the illustrated embodiment, the holder 102 has the shape of a ring-segment and is to be attached concentrically with respect to a central axis of the speaker 104. However, the present disclosure is not limited in this regard. The holder 102, the PCB 108 and the housing 110 may have other shapes. In particular, the holder 102, the PCB 108 and the housing 110 may have shapes that correspond to the shape of a speaker to which the illumination module 118 is to be attached as an add-on module.

Also, whilst shown as a separate element in FIG. 1, the printed circuit board 108 may be an integral part of the holder 102. In another embodiment, the lenses 116, instead of being part of the holder 102, may be arranged on the surface of the PCB 108 on top of the light sources 122. In this embodiment, the holder 102 may have openings that align with the light sources 122 and lenses 116 to allow light emitted from the lenses 116 to pass therethrough and onto the backside of the membrane 130.

Figure 2B:
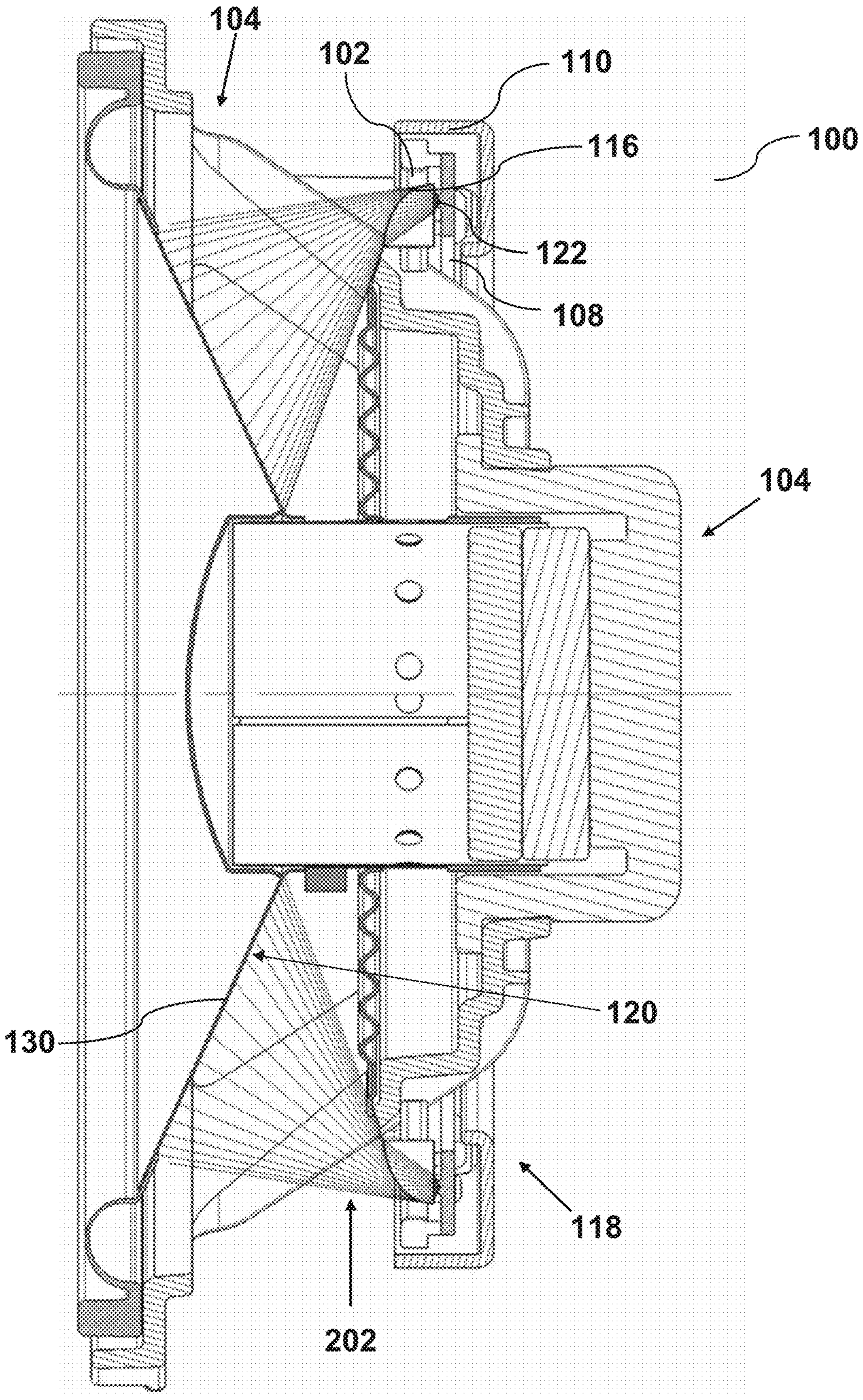
FIG. 2B illustrates a cross-sectional view of the assembled system of FIG. 2.

In the assembled state of the module 118, as illustrated in FIGS. 2A and 2B, the lenses 116 may be arranged at a distance from the backside of the membrane 130 of the speaker 104, so as to allow light emanating from the lenses 116 to spread. The backside of the membrane 130 may form an illumination area 120 onto which light from the light sources 122 is projected by the lenses 116. The membrane 130 may be formed by a diaphragm that is at least partially translucent. Thus, light projected onto the illumination area 120 is visible at the front side of the membrane. The front side of the membrane 130 is usually visible to a user, for example a driver or passenger of a car. The front side of the membrane may be visible directly or through a translucent or transparent speaker cover. Thus, the illuminated membrane 130 can provide ambient light or convey information to the user, for example a warning signal (e.g. flashing red illumination).

Figure 3:
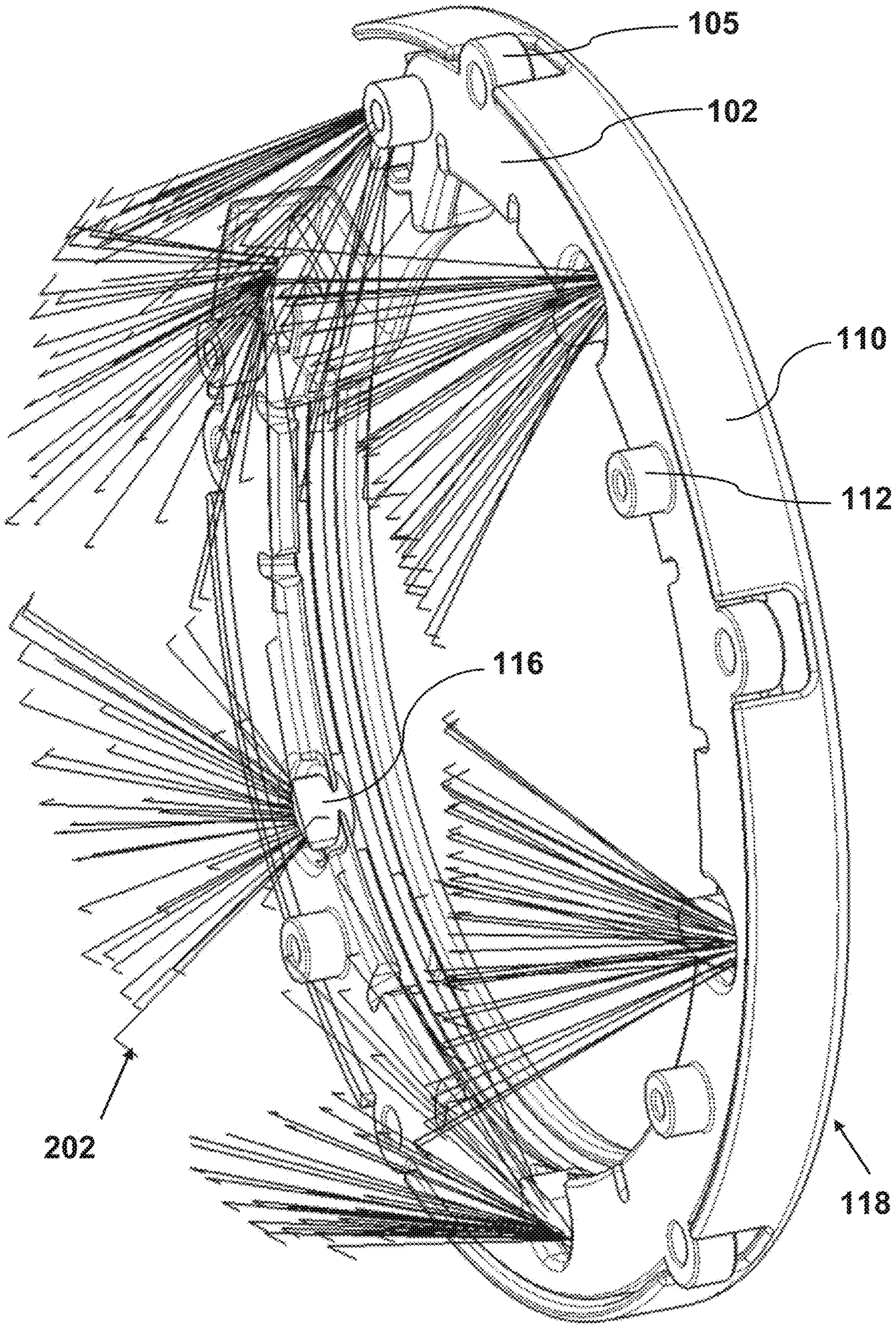
FIG. 3 illustrates an illumination module in accordance with one of a number of embodiments.

The lenses 116 may be freeform lenses, i.e. lenses with at least one optical freeform surface. The lenses 116 may partially protrude from the upper surface of the holder 102, as shown for example in FIGS. 2 and 4. As illustrated in FIGS. 2, 3 and 6, the freeform lenses are formed and arranged at the holder 102 such as to enable illuminating the entire illuminable area 120. The result is shown in picture A of FIG. 7 where the entire membrane 130 is illuminated substantially evenly.

Each of the projection elements 114 may illuminate a respective part of the illuminable area 120, as indicated by light rays 202. Thereby, different portions of the illuminable area 120 can be selectively illuminated. For example, as illustrated in FIG. 3, six projection elements 114 are arranged equidistantly from one another on the ring-shaped illumination module 118.

Figure 7:
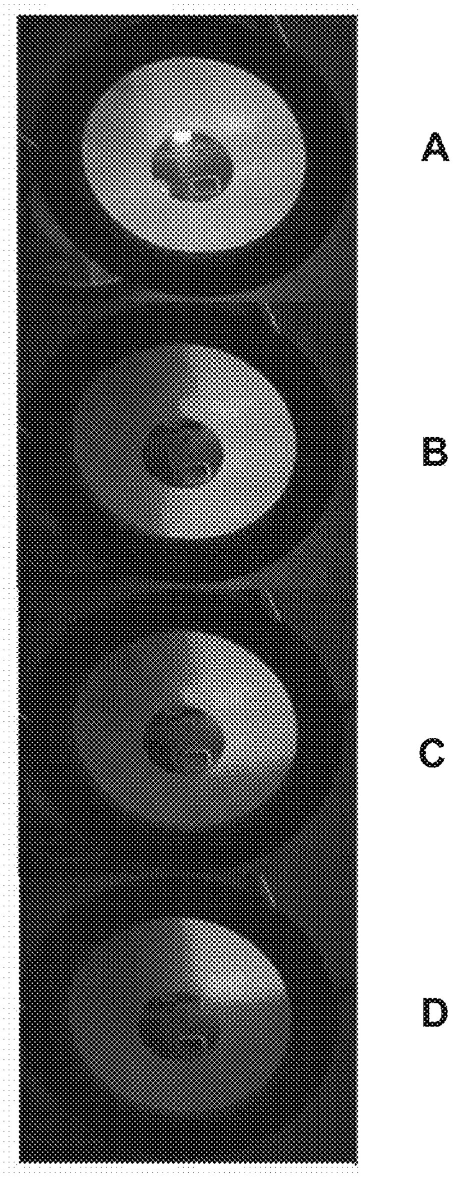
FIG. 7 illustrates speaker membranes partially or fully illuminated by an illumination module in accordance with one of a number of embodiments.

Thus, the illuminable area 120 may have a number of separately illuminable sections (e.g. six). The number of lenses 116 and corresponding light sources 122 may correspond to the number of separately illuminable sections of the illuminable area 120. The light sources 122 may be controlled independently of one another. Accordingly, it is possible to generate different and varying illumination patterns. FIG. 7 shows pictures of fully (picture A) and partially (pictures B-D) illuminated membranes 130.

Figure 4:
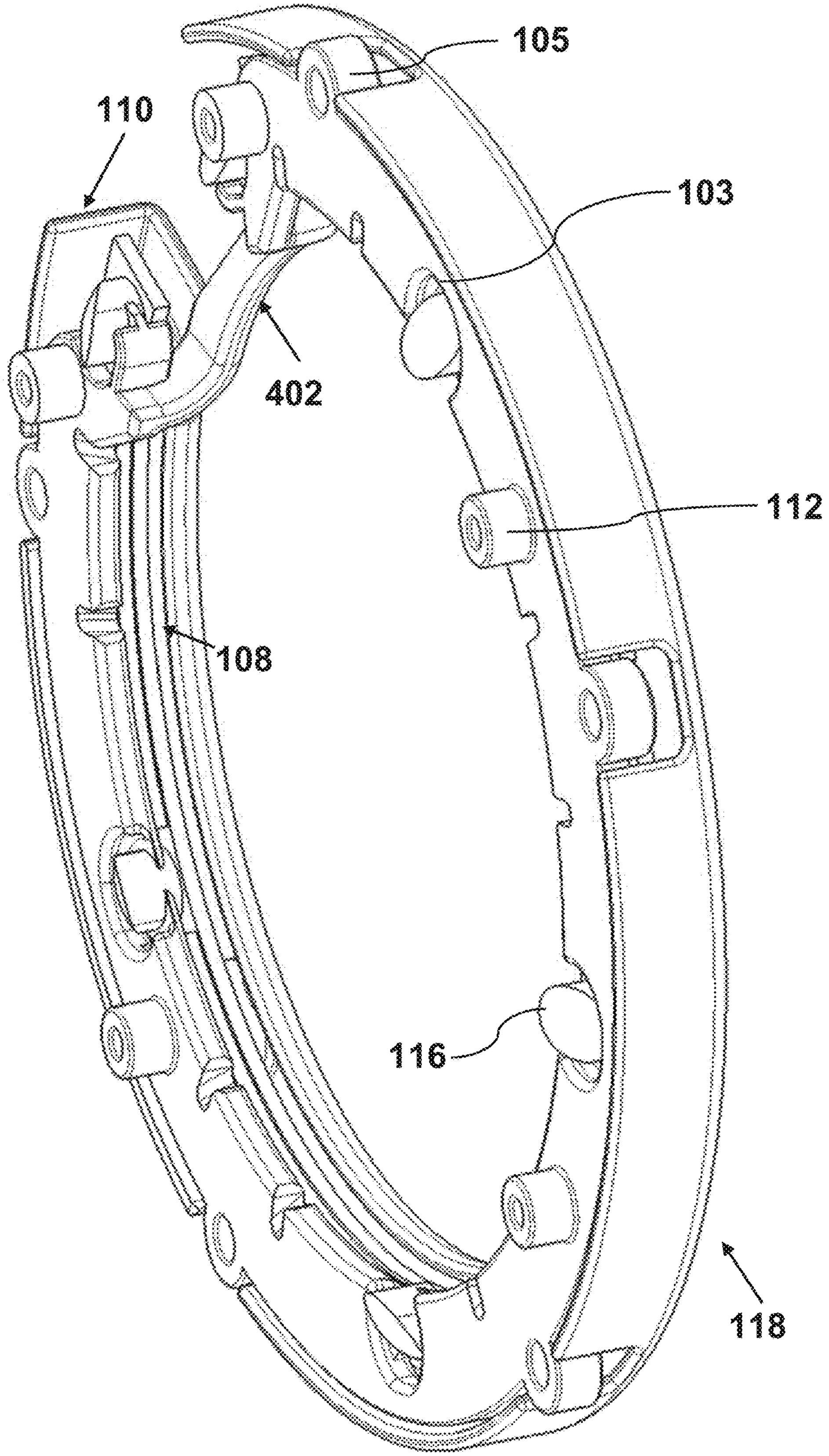
FIG. 4 is another illustration of the illumination module of FIG. 3.
Figure 5:
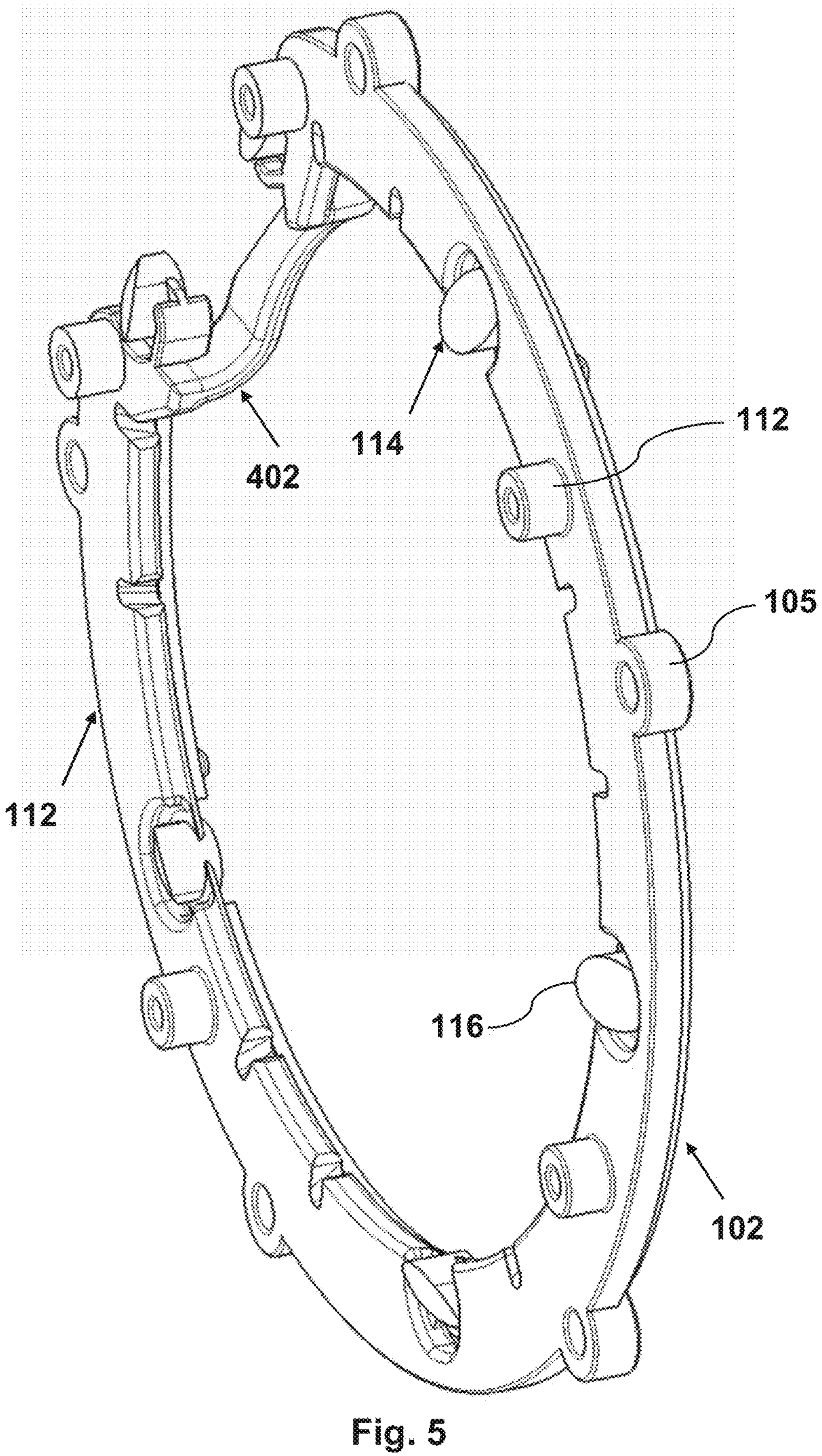
FIG. 5 illustrates components of an illumination module in accordance with one of a number of embodiments.

As illustrated in FIG. 4, the holder 102 may include a bridge 402 connecting the free ends of the ring-segment-shaped holder. The bridge 402 serves to increase the mechanical strength of the holder 102.

The holder 102 may be made of a plastic material, to provide a light-weight structure that is inexpensive to manufacture. Alternatively, the holder 102 may be made of metal, to provide extra strength to the structure. Similarly, the housing 110 may be made of plastic or metal.

Figure 6A:
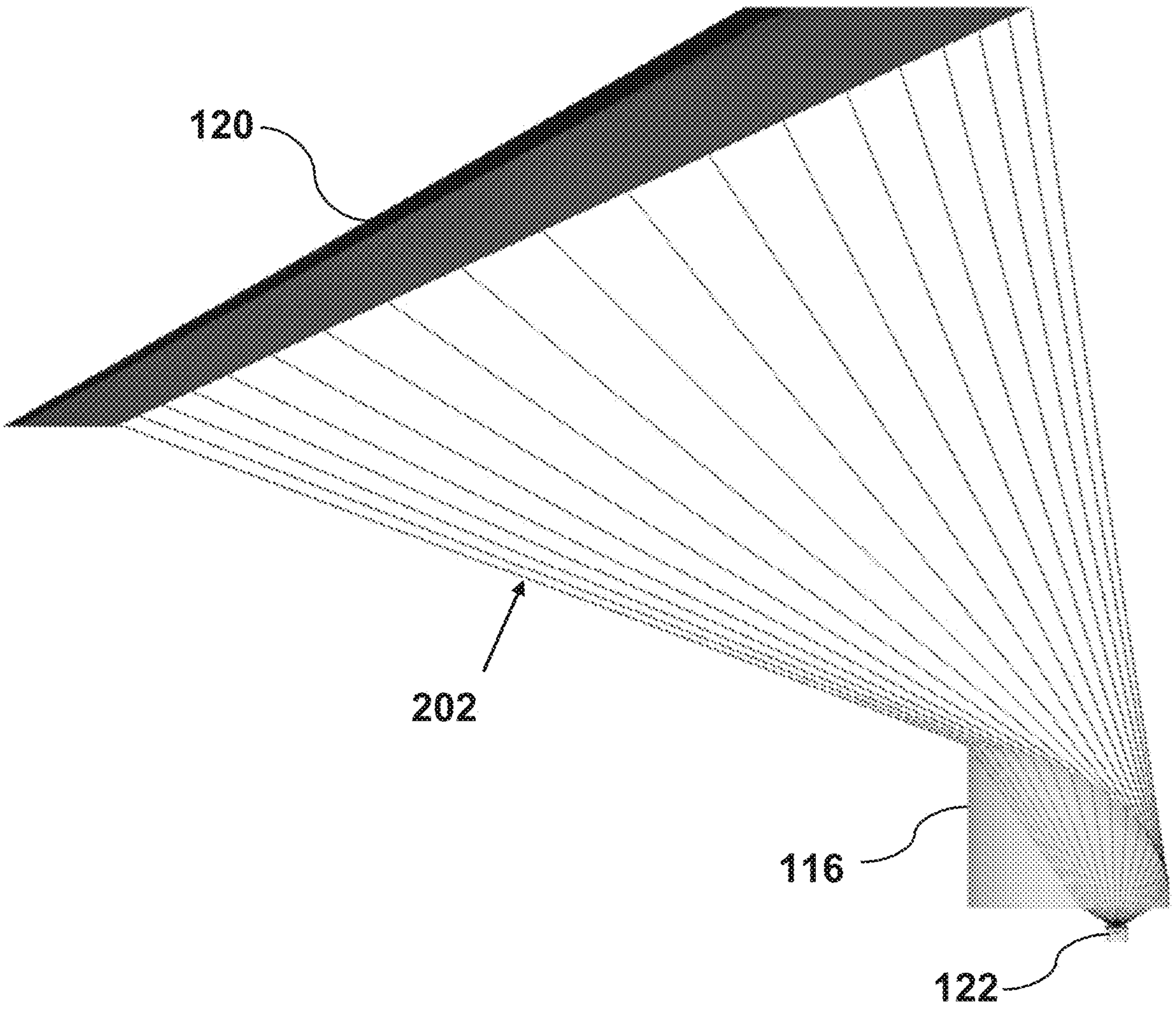
FIG. 6A illustrates the path of rays through a freeform lens that may be part of an illumination module in accordance with one of a number of embodiments.
Figure 6B:
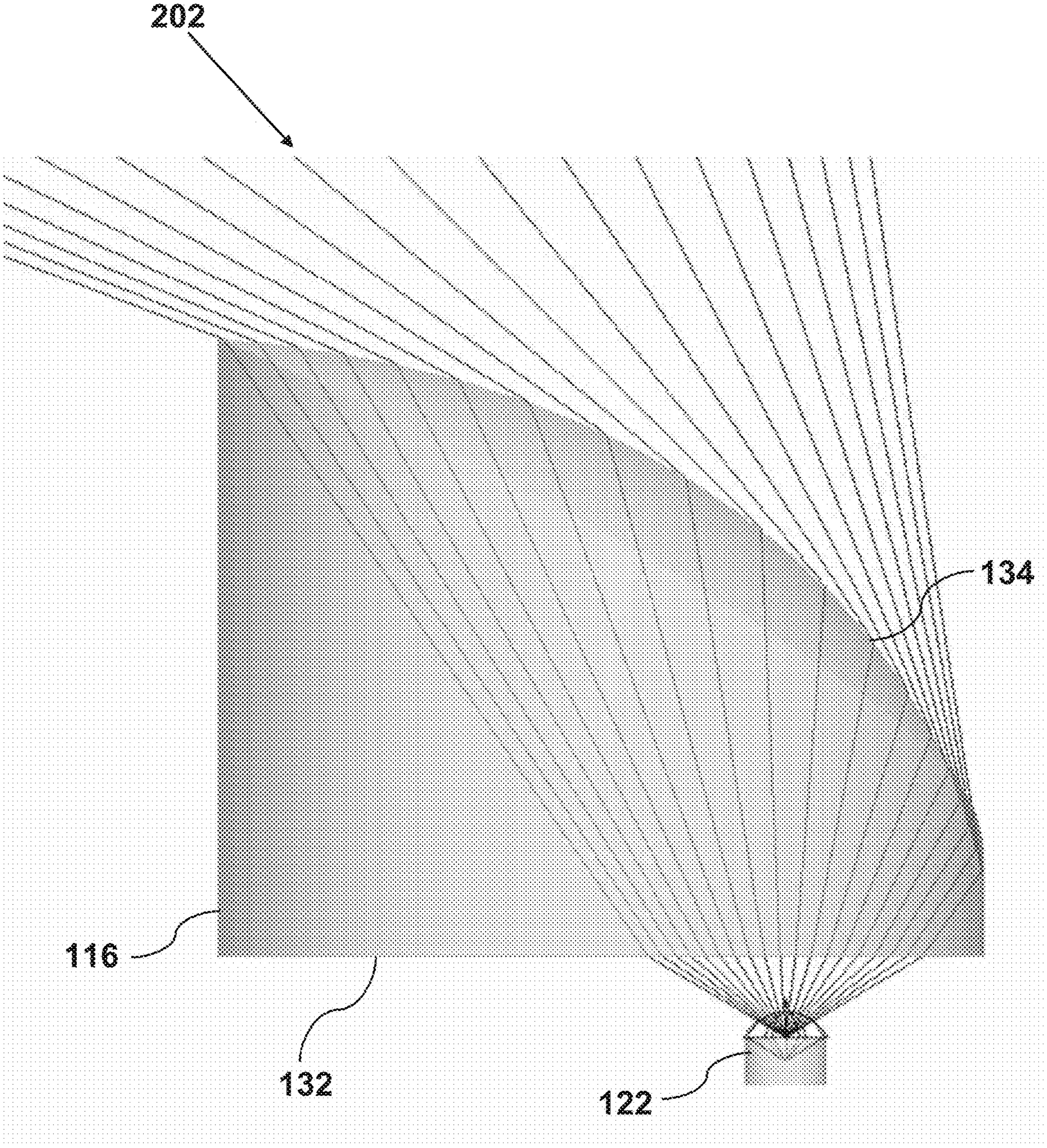
FIG. 6B illustrates another view of the path of rays through the freeform lens of FIG. 6A.

FIGS. 6A and B illustrate the paths of the light rays 206 through one of the lenses 116 of the illumination module 118 in more detail, in accordance with one of a number of embodiments. Light is emitted by the light source 122 and deflected while passing through the lens 116, thereby to illuminate a portion of the illuminable area 120. The freeform lens 116 is shaped to optimize illumination of a non-ideal surface. In the illustrated example, the lens 116 has a planar lower surface 132 facing the light source 122, and a curved upper surface 134 facing the illuminable area 120. The lens 116 is shaped so as to provide the desired illumination characteristics on the illuminable area 120. For example, the membrane 130 may be conical, resulting in a curved illuminable area 120. The curvature of the curved upper surface 134 may be configured to compensate for the curvature of the illuminable area 120, in order to obtain an even illumination of at least a portion of the illuminable area 120.

In view of the above, an illumination module according to the present disclosure can be added to a speaker of an in-vehicle audio system to provide different kinds of illumination in the vehicle interior. The illumination module can be implemented by way of a lightweight add-on module that requires little extra space and energy.

The description of embodiments and aspects has been presented merely for purposes of illustration and description. Suitable modifications and variations to these embodiments and aspects may be performed in light of the above, and different embodiments and aspects may be combined where possible and appropriate, without departing from the scope of protection as determined by the claims.

What is claimed is:

1. An illumination module for a speaker, the illumination module comprising:

a holder configured to be removably attached to a back side of the speaker;

a plurality of light sources for emitting light; and a plurality of lenses for projecting light from the plurality of light sources onto an illuminable area of the speaker, wherein each lens in the plurality of lenses projects light emanating from a different light source in the plurality of light sources and is located in a different cavity in a plurality of cavities comprising recesses formed within a surface of the holder.

2. The illumination module of claim 1, further comprising:

a printed circuit board (PCB) comprising the plurality of light sources;

wherein the PCB is configured to be attached to the holder whereby the plurality of light sources is aligned with the plurality of lenses.

3. The illumination module of claim 2, wherein the PCB is annular or ring-segment-shaped.

4. The illumination module of claim 2, wherein the lenses included in the plurality of lenses and the light sources included in the plurality of light sources are equidistantly arranged at a perimeter of the holder and the PCB, respectively.

5. The illumination module of claim 2, further comprising:

a housing for receiving the holder and the PCB;

wherein the housing is configured to be attached to the speaker.

6. The illumination module of claim 1, wherein:

each of the plurality of lenses is configured to project light from a respective one of the plurality of light sources onto the illuminable area.

7. The illumination module of claim 6, wherein each of the plurality of lenses is configured to project light onto a respective portion of the illuminable area.

8. The illumination module of claim 1, wherein the lenses are integrated in or attached to the holder.

9. The illumination module of claim 1, wherein the plurality of lenses comprises one or more optical freeform lenses.

10. The illumination module of claim 1, wherein each light source in the plurality of light sources is individually controllable.

11. The illumination module of claim 1, wherein:

the holder is annular or ring-segment-shaped; and the holder is attachable concentrically to the back side of the speaker.

12. The illumination module of claim 1, wherein each light source of the plurality of light sources is a light emitting diode (LED).

13. The illumination module of claim 1, wherein each light source of the plurality of light sources is a red, green, blue+white (RGBW) light emitting diode (LED).

14. A speaker system comprising:

a speaker having a membrane; and an illumination module comprising:

a holder configured to be removably attached to a back side of the speaker;

a plurality of light sources for emitting light; and a plurality of lenses for projecting light from the plurality of light sources onto an illuminable area of the speaker, wherein each lens in the plurality of lenses projects light emanating from a different light source in the plurality of light sources and is located in a different cavity in a plurality of cavities comprising recesses formed within a surface of the holder.

15. The speaker system of claim 14, wherein:

the illumination module is attached to a backside of the speaker; and the illuminable area is formed by at least a portion of the membrane.

16. The speaker system of claim 15, wherein at least a portion of the illuminable area is translucent.

17. The speaker system of claim 14, wherein the membrane is cone shaped.

18. The speaker system of claim 14, wherein the illuminable area comprises a plurality of illuminable portions corresponding to a number of the plurality of lenses and the plurality of light sources.

19. The speaker system of claim 14, further comprising a controller to control the light sources in conjunction with at least one of an in-vehicle audio system, an in-vehicle navigation system, or a driving assistance system.

* * * * *